(12) United States Patent
Burns et al.

(10) Patent No.: US 7,771,633 B2
(45) Date of Patent: Aug. 10, 2010

(54) METHOD OF MANUFACTURE OF THREE-DIMENSIONAL OBJECTS FOR ABSORPTION OF HYDROCARBONS AND LOW-POLARITY CHEMICALS

(75) Inventors: Lyle D. Burns, Bartlesville, OK (US); Geoffrey O. Mitchell, Norman, OK (US)

(73) Assignee: RTA Systems, Inc., Bartlesville, OK (US)

( * ) Notice: Subject to any disclaimer, the term of this patent is extended or adjusted under 35 U.S.C. 154(b) by 423 days.

(21) Appl. No.: 12/029,319

(22) Filed: Feb. 11, 2008

(65) Prior Publication Data

US 2008/0211140 A1    Sep. 4, 2008

Related U.S. Application Data

(63) Continuation-in-part of application No. 11/506,454, filed on Aug. 18, 2006, now Pat. No. 7,329,355.

(51) Int. Cl.
*B29C 43/02* (2006.01)
*B29C 47/78* (2006.01)

(52) U.S. Cl. ................... 264/112; 264/123
(58) Field of Classification Search ............ None
See application file for complete search history.

(56) References Cited

U.S. PATENT DOCUMENTS

| 5,994,450 | A  | * | 11/1999 | Pearce ................ 524/505 |
| 6,824,734 | B2 | * | 11/2004 | Boggs et al. ........... 264/567 |
| 7,048,878 | B2 | * | 5/2006 | Rink et al. ............. 264/41 |
| 7,159,259 | B2 | * | 1/2007 | Chen ................... 5/655.5 |

* cited by examiner

*Primary Examiner*—Mary Lynn F Theisen
(74) *Attorney, Agent, or Firm*—Fellers, Snider, Blankenship, Bailey & Tippens

(57) ABSTRACT

The present invention relates to methods of recovering hydrocarbons or low polarity organic chemicals from hard surfaces, water and water surfaces, in their vapor state and from porous substrates. The hydrocarbons or low-polarity organic chemicals may be included in a spill. More particularly, the invention relates to the absorption of certain hydrocarbons and low-polarity organic chemicals by applying thermoplastic elastomers of a triblock copolymer of the general configuration A-B-A. The preferred A-B-A copolymer of the invention is a low to medium molecular weight hydrogenated polystyrene-poly(isoprene+butadiene)-polystyrene or polystyrene-b-ethylene/ethylene-propylene-b-styrene block copolymer. The method of forming a three-dimensional object from a hydrocarbon or low-polarity organic chemical absorbing substance includes: applying pressure to particles of a polymeric material comprising a styrene-ethylene/ethylene/propylene triblock copolymer containing from approximately 20 to 40 percent styrene, and; heating the particles for a period of time sufficient to form the three-dimensional object.

22 Claims, No Drawings

METHOD OF MANUFACTURE OF THREE-DIMENSIONAL OBJECTS FOR ABSORPTION OF HYDROCARBONS AND LOW-POLARITY CHEMICALS

This application is a continuation-in-part application of U.S. patent application Ser. No. 11/506,454, filed Aug. 18, 2006, which application is incorporated herein by reference.

BACKGROUND OF THE INVENTION

1. Field of Invention

This invention relates to a method for controlling and recovering hydrocarbon or certain low-polarity organic chemicals.

2. Brief Statement of the Prior Art

Hydrocarbon fuel, oil, and chemical spills occur frequently on a multitude of surfaces. On land, clay sorbents, cellulose or sphagnum products, surfactants, or other bioremedial methods to name a few are used in these situations with the intent of cleaning up the spill in a quick fashion or bioremediating a contaminated soil surface over time. On the water, spills tend to present unique problems and require the responders to assess each spill quickly and choose among a variety of spill response products such as absorbents, adsorbents, gelling agents, sinking agents, surface washing agents, dispersants, biodegradation agents, biodegradation enhancers, de-mulsifiers, herding agents and approaches such as in situ burning. Factors such as cold water or broken ice conditions can change the physical state of crude oils making broad application of chemical dispersants more difficult and ineffective.

Various techniques and materials have been used as absorbents in helping to minimize contamination resulting from hydrocarbon fuel, oil, and chemical spills. Absorbents generally function by attracting materials to their pore spaces. Adsorbents such as polypropylene fibers function by hydrophobic nature in water and oleophilic attraction of the oil to wick into the surface area of the fiber.

Furthermore, various elastomeric materials of the prior art are disclosed regarding A-B-A triblock elastomers for hydrocarbon absorption during environmental cleanup on water. The A-B-A elastomers currently utilized include Styrene-Butadiene-Styrene, SBS or Styrene-Isoprene-Styrene, SIS (U.S. Pat. No. 3,518,183), Styrene-Butadiene-Styrene/Ethylene-Propylene Diene Monomer, SBS/EPDM (U.S. Pat. No. 6,344,519), Styrene-Ethylene-Butylene-Styrene, SEBS (U.S. Pat. No. 4,941,978 and U.S. Pat. No. 5,104,548), or Styrene-Ethylene-Propylene-Styrene, SEPS (U.S. Pat. No. 6,056,805).

Many of the prior art copolymers used in spill cleanup, due to their absorbent properties, are of the SEBS type copolymer. A SEBS type copolymer is a polystyrene-poly(ethylene/butylene)-polystyrene copolymer. Examples are KRATON G-1650 or KRATON G-1651 or KRATON G-1652 made by Shell Chemical Company. The KRATON G series, produced by anionic polymerization, are block polymers in which the elastomeric portion of the molecule is a saturated olefin polymer of the type ethylene/butylenes.

However, while the current triblock elastomers have been useful in containing spills, there remains a need for absorbents that have improved elasticity and tensile strength over the prior art with comparable softness. Moreover, there is a need for materials that reduce or eliminate oil bleed during spill absorption. Finally, there is a need for materials that can accomplish the aforementioned goals while remaining cost effective.

Thermoplastic elastomers are a class of polymers that behave like thermoset rubber except that above their melt or softening temperatures are melt processable via thermoplastic processing methods. Unlike thermoset rubber, they can be easily reprocessed and remolded. The ability to process these materials with thermoplastic methods allows for design and fabrication freedom that thermoset rubber does not offer.

The block co-polymers of this patent application are comprised of blocks of crystalline and amorphous domains along the same polymer chain. The crystalline domain acts as the crystalline portion that give thermoplastic elastomers their thermoplastic character and the hydrogenated olefin amorphous domain provides the elastomeric character. Crystalline domains are typically referred to as the "hard" phase and the amorphous domains as the "soft" phase. While both phases contribute to the overall physical and mechanical properties of a thermoplastic elastomer, some key properties may be associated with one phase or the other.

Thermoplastic elastomers are often injection molded to form objects of practical use such as food and beverage containers or soft toy parts, just to name a few examples. Injection molding is the process of melting the plastic to flow inside a barrel and injecting the melt into a mold cavity, where it cools until it keeps the shape of the cavity. Injection molding offers many advantages to alternative manufacturing methods, including minimal losses from scrap since scrap pieces can be melted and recycled, and minimal finishing requirements.

"Compression" refers to the process or result of pressing by applying force on an object, thereby increasing the density of the object. The ability of a material to return to its original shape after being subjected to a predetermined compressive strain or load is known as "compression set". Specifically, when compression is applied to a structure, it displays elastomeric properties and will essentially recover to its original position upon relaxation. Compression set is sometimes used to describe such elastic recovery. Softness, flexibility, elasticity, and resiliency are also demonstrated through compression set resistance as measured by ASTM D3575. Compression set is reported as a percent of compression that is not recovered. Rink (U.S. Pat. No. 6,344,519) claims for the SBS-EPDM polymer blends that bulk densities greater than 0.75 g/cc tend to prevent the oil from entering formed bodies, while bulk density smaller than 0.45 g/cc cause the bodies to fragment, either when dry or after absorbing oil.

Compression molding consists of a top and bottom plate mold that is machined to a custom configuration. The elastomer is added between the plates and the plates are compressed under heat and pressure for a specific amount of time. The heat applied is usually at or above the melt point of the polymer. After the elastomer is cured properly, the mold is opened, the part is removed, the mold cleaned and the cycle repeated.

U.S. Pat. No. 6,344,519 and U.S. Pat. No. 7,048,878 to Rink, et al. is a process for forming an oil-sorbent composition of matter with bound combinations of styrene-butadiene-styrene (SBS) and ethylene propylene diene monomer (EPDM) as a binder material. The process utilizes an extrusion process or a compression molding process. Rink formed cylindrical bodies between two and about five centimeters across the outer diameter with a hole about one to two centimeters in diameter along the longitudinal axis. The length of the cylinder was seven centimeters corresponding to an outside diameter of 3 centimeters. The EPDM copolymer with a lower melt temperature than the SBS block copolymer acts as a binder, holding the SBS particles together without significantly damaging the physical structure of the SBS block copolymer, thereby reducing the ability of the SBS to absorb hydrocarbons. However, the EPDM, present at 10-30 weight percent, is not as efficient as SBS in oil absorption. In fact, the SBS block copolymer is generally deemed inferior to the SEEPS triblock polymer for absorbing and retaining hydrocarbons in the amorphous matrix. According to Tony M. Pearce (US 2006/0194925) relating to gelatinous elastomer products, "Most makers of gelatinous elastomer materials and articles today express a strong preference for gels made with SEEPS rather than SEBS due to superior strength and elongation, reduced oil bleed, and other desirable material properties."

In order to melt process the Kraton D SBS block copolymer in U.S. Pat. No. 7,172,721 to make doll heads, Wong used the normal processing temperatures in the range of 175-200° C. at 400-700 psi. These conditions are in the recommended range prescribed by the Shell Chemical Technical Bulletin, SC:455-96 for melt processing of Kraton D polymers. In U.S. Pat. No. 7,122,603, Ikeda describes an injection or compression molding process for thermoplastic elastomer compositions which whereby the molded composition exhibits greatly suppressed compression set and satisfactory tensile strength while exhibiting low hardness. Although the pressures associated with the invention are not disclosed, the temperature was referenced at 284° F.

To achieve optimal bond strength, higher than normal melt temperatures are often required for thermoplastic elastomers. In some critical applications, this temperature can be close to the upper processing temperature limits for the TPE. Melt temperatures of 400-460° F. are common.

Compression molding is used primarily for composite parts and thermoset resins involving a curing process. It is also employed to process thermoplastic resins. Generally speaking compression molding of thermoplastic elastomers requires that the mold temperature be at or around the melt temperature of the polymer. Anything less leads to undesirable product properties. A need, however, exists in the art to form an elastomeric block copolymer, such as the described polymers of the present disclosure, at temperatures and pressures well below what might be expected in order to form typical products of utility through compression molding processes.

SUMMARY OF THE INVENTION

The present invention relates to methods of recovering spills of hydrocarbons and low polarity organic chemicals from hard surfaces, water and water surfaces, in their vapor state and from porous substrates. Such recovery may be necessitated by spills or other undesirable deposits of may be the result of manufacturing or production processes, such as, for example, oil drilling and/or production, all referred to herein, generally, as a spill or "spills." More particularly, the invention relates to the absorption of certain hydrocarbons and low-polarity organic chemicals by applying thermoplastic elastomers of a triblock copolymer of the general configuration A-B-A. The preferred A-B-A copolymer of the invention is a low to medium molecular weight hydrogenated polystyrene-poly(isoprene+butadiene)-polystyrene or polystyrene-b-ethylene/ethylene-propylene-b-styrene block copolymer often referred to as SEEPS. This preferred elastomeric block copolymer has improved elasticity and tensile strength over the prior art with comparable softness and reduces or eliminates oil bleed while and remaining cost effective and easy to manufacture. In one embodiment, when the elastomeric block copolymer is applied to hydrocarbons or low-polarity organic chemicals, the elastomeric block copolymer absorbs the hydrocarbons or low-polarity organic chemicals to form a mat.

In accordance with another embodiment, the material of the invention can be used as a filter medium to separate liquid or gaseous non-polar hydrocarbons and chemicals from highly polar compounds.

In accordance with a further embodiment, the material can be placed into a disposable sock, boom, or pad covering. The sock, boom, or pad allows the hydrocarbon or low-polarity chemical to pass through the covering, but does not allow the inventive material to pass out of the covering before or during use. The hydrocarbon or low-polarity chemical mixes with the inventive material and neither the spill nor the mixture returns to the environment.

In accordance with a further embodiment, the elastomeric block copolymer can be mixed with metal stearate or with a styrene-ethylene/butylenes diblock or triblock copolymer. These mixtures allow for better absorption characteristics of the inventive material with respect to certain types of spills.

In accordance with another embodiment, the elastomeric block copolymer can be mixed with drilling mud and drill cuttings. The resulting mixture creates a material that functions well as a fuel source capable of giving off 19,000 British Thermal Units (BTU's) of energy.

In accordance with another embodiment, the elastomeric block copolymer, in particulate form, is formed into various shapes using novel, modified compression forming techniques tailored specifically to achieving desired absorbency, high surface area, compression set, and strength characteristics of the formed polymer granules well below the typical pressure and temperature ranges for forming objects from SEEPS polymer. These elastomeric block copolymer designs may be used to recover hydrocarbons or low-polarity organic chemicals from hard surfaces or the surface of water.

In the current invention, a method is described to form three dimensional structures using SEEPS crumb (particulate, or particles) using moderate pressures (10-400 psi) at modest temperatures (80-300° F., hereinafter defined as "low temperatures", and optimally between 90 and 250° F.) which is well below the melting point typical of SEEPS polymers. This "cold setting" process can be used to form structures much larger with high tensile strength than those described in the prior art (U.S. Pat. No. 6,344,519 and U.S. Pat. No. 7,048,878) without the need of a binding agent such as EPDM to "bind" the polymer granules together. The unique properties of the low molecular weight SEEPS polymers with the soft isoprene/butadiene amorphous chains, provides significant improvement in the low temperature forming characteristics compared to other materials.

This "cold setting" fabrication process does not significantly affect the inherent oil absorbing properties of the polymer, but it provides significant structural memory to allow large three dimensional forms to be created. These forms such as disks, pads, and boom (cylindrical) structures are deployable for the purposes of hydrocarbon and low polarity chemical spill clean-up on hard surfaces and water surfaces with minimal loss of granules from the structure.

A preferred method of forming a three-dimensional object from a hydrocarbon or low-polarity organic chemical absorbing substance includes the steps of:
  applying pressure to particles of a polymeric material comprising a styrene-ethylene/ethylene/propylene triblock copolymer containing from approximately 20 to 40 percent styrene, and
  heating the particles for a period of time sufficient to form the three-dimensional object.

The three-dimensional object may be molded by either compression or vacuum molding processes in pressures from approximately 20 to 500 psi with approximately 40 to 400 psi preferred.

An alternate preferred method of forming a solid three dimensional object of a geometry for absorbing hydrocarbons or non-polar organic chemicals includes the steps of:

placing the geometrically extruded mixture in a sock, boom, or pad containing said thermoplastic elastomer triblock copolymer in contact with a hydrocarbon or low polarity organic chemical, wherein the sock, boom, or pad comprises a fabric or textile sheathing having pore size of approximately 200 microns;

permitting the hydrocarbon or low-polarity organic chemical to penetrate the sheathing to mix with said thermoplastic elastomer triblock copolymer geometric pellets; and recovering the sock, boom, or pad.

These and various other features and advantages which characterize the claimed invention will be apparent from reading the following detailed description.

DESCRIPTION OF THE PREFERRED EMBODIMENTS

Before explaining the present invention in detail, it is important to understand that the invention is not limited in its application to the details of the construction illustrated, or by the steps of construction inherently present by way of illustration. The invention is capable of other embodiments and of being practiced or carried out in a variety of ways. It is to be understood that the phraseology and terminology employed herein is for the purpose of description and does not impose limitation on the present invention.

In a preferred embodiment, for the material used to absorb hydrocarbons and low-polarity organic chemicals is a thermoplastic elastomer of a triblock copolymer of the general configuration A-B-A. Preferably, the chemical structure is polystyrene-poly(ethylene/ethylene/propylene)-polystyrene known more commonly as SEEPS. The ethylene segment in the SEEPS is derived from the polymerization of 1,3-butadiene to a poly2-butene segment, which after catalytic hydrogenation becomes a saturated hydrocarbon and named as an ethylene segment. The ethylene/propylene monomer in SEEPS is derived from the molecule isoprene.

One widely available SEEPS type which is suitable for the present invention is SEPTON 4033, SEPTON 4045, SEPTON 4055, and SEPTON 4077, manufactured by Septon Company of America in Pasadena, Tex., a part of Japan's Kuraray, Co. Ltd. of Tokyo, Japan. The only difference between the SEPTON triblock copolymers is molecular weight, however SEPTON 4033 is the most preferred version. However, it should be apparent to one of ordinary skill in the art that other triblock copolymeric materials made by others with similar chemical and physical characteristics can be used as a triblock copolymer of the invention as well.

The SEPTON 4000 (SEEPS) series block copolymers are made from hydrogenated styrene isoprene/butadiene styrene blocks or more specifically, the soft block is made from hydrogenated 2-methyl-1,3-butadiene (isoprene) and 1,3-butadiene. In controlled polymerization, if the ethylene portion of the mid block (EB/EP) is substantially greater than the butylene, then the copolymer should exhibit ethylene crystallinity in the mid block.

The styrene portions of the SEPTON 4033 constitute 30% of its weight. SEPTON 4033 has a mid block which is prepared from a combination of 1,3-butadiene and 2-methyl-1,3 butadiene (isoprene) monomers. The mid block produced by polymerization of those monomers has a carbon backbone, which includes, on average, one double bond every four carbons. After polymerization, over 90 percent of the double bonds of the SEPTON 4033 mid block backbone are removed by hydrogenation. The mid block also has only methyl side chains. The methyl side chains of the SEPTON 4033 mid block are a result of the use of isoprene monomers in polymerization.

In the preferred embodiment of the invention, the thermoplastic elastomer triblock copolymer is applied to hydrocarbons or low-polarity organic chemicals. In one embodiment, the hydrocarbons or low-polarity organic chemicals occur in the form of a spill on a surface, such as a body of water. When the triblock copolymer mixes with the hydrocarbons or low-polarity organic chemicals, the triblock copolymer absorbs the hydrocarbons or low-polarity organic chemicals to form a mat. This mat can then easily be recovered. For the purpose of exemplification, and without limitation, the hydrocarbon or low-polarity organic chemical may be any of at least one of: oils, waxes, hydrocarbons, fuels, crude oils, bitumen, edible oils, edible waxes, saturated aliphatic, unsaturated aliphatic, napthenic, aromatic substituted oxygen derivatives of alcohols, phenols, ethers, ether alcohols, epoxides, esters, ester derivatives, aldehydes, acetals, ketones, ketals, nitrogen containing derivatives of amines, nitrites, sulfur containing derivatives of mercaptans, disulfides, heterocyclic derivatives of disulfides, halocarbons, organosilanes, halosilanes, silicones, agricultural chemicals, industrial chemicals, chemical warfare agents, or chemicals derived from petroleum.

Ideally, the triblock elastomer should recover 100% of the oil or hydrocarbon from a surface or leave only very low ppm of substance on the surface to be cleaned. The elastomer should retain the hydrocarbon or low-polarity organic chemical without bleeding. The elastomer/(hydrocarbon or low-polarity organic chemical) ratio by weight of the present invention ranges from as 1/1 to about 1/15 depending on the specific hydrocarbon or low-polarity organic chemical. In applications where oil bleed is acceptable, or the amount of residual bleed is tolerable economically, the ratio may as high as about 1/25 or more. Preferably, the elastomer/hydrocarbon low-polarity organic chemical ratio is in the range of about 1/1 to about 1/10. More preferred are elastomer/oil or hydrocarbon or low-polar organic chemical ratios in the range of about 1/2 to about 1/4.

A preferred ratio, such as 1/4, generally provides the desired amounts of rigidity, elasticity and strength with low bleed for many typical spill applications. Another preferred elastomer to hydrocarbon or low-polarity organic chemical ratio of the preferred materials of the present invention is 1/3, which possesses an unexpectedly high amount of strength and elongation.

When the triblock copolymer of the invention is contacted with the hydrocarbon or non-polar organic chemical contaminant, the absorption that occurs that may take from minutes to up to one hour or longer, depending on conditions, nature of the contaminant, temperature, humidity, etc. As the mat continues to form over time, the mat will strengthen as the level of absorption continues to grow. Loading capacity for the triblock copolymer of the invention is at least 2:1 (200 percent) by weight of contaminant to polymer to 10:1 (1000 percent) as shown by the examples below of the invention with liquid contaminants where efficiency is 100 percent.

In one embodiment, mixtures of elastomers are suitable as the elastomer component for some of the formulations of the present invention. In elastomer mixtures, each elastomer contributes different properties to the material. For example, high strength elastomers are desired to improve the tensile strength and durability of a material. Likewise, addition of A-B diblock copolymers to an A-B-A triblock copolymers reduced oil bleed and tackiness.

In another embodiment, the elastomeric material of the present invention may also include a de-tackifier. Soaps, detergents and other surfactants often have detackifying abilities and are suitable for use in the present invention. "Surfactants," as defined herein, refers to soluble surface active agents which contain groups that have opposite polarity and solubilizing tendencies, as well as detergency, foaming, wetting, emulsifying and dispersing properties. For example, but not by way of limitation, coco diethanolamide, a common ingredient in shampoos, may be suitable in the present invention as a de-tackifying agent. Other preferred de-tackifiers include glycerin, epoxidized soybean oil, dimethicone, tributyl phosphate, block copolymer polyethers, diethylene glycol mono oleate, and silicone.

In a further embodiment, the elastomeric material of the present invention may also be made non-adhering, non-sticking, and non-tacky by incorporating an advantageous advantage amount of a metal stearate such as sodium, calcium, magnesium or zinc stearate. Sodium stearate is particularly suitable to improve strength and reduce tack in the material of the invention.

A preferred triblock copolymer of the present invention may contain other additives such as primary antioxidant stabilizers to protect against free radical thermo-oxidative degradation. A common primary antioxidant such as IRGANOX 1010, from Ciba-Geigy Corporation of Tarrytown, N.Y., may be used in conjunction with a secondary antioxidant. IRGANOX 1010 is commonly known as Tetrakis[methylene(3,5-di-t-butyl-4-hydroxyhydrocinnimate)]methane. Secondary antioxidants may also be used. Secondary antioxidants are hydroperoxide decomposers and constitute chemicals such as phosphites, phosphonites and thioesters. For example, and not by limitation, chemicals such as distearyl pentaerythritol diphosphite, sold under the trade name of Weston 618 from GE Specialty Chemicals, Morgantown, W. Va., and dilauryl thiodipropionate available from Chemtura USA Corporation, Middlebury, Conn., are suitable secondary antioxidants.

In a further embodiment, other additives might be incorporated into specific applications of the present invention to act as flame retardants. Examples of these additives include, but are not limited to, diatomaceous earth, colorants and pigments, bleed modifiers such as diblock copolymers, and tensile strength modifiers such as other hydrocarbon resins that might associate with the mid block "B" copolymer.

The types of oils, hydrocarbons and low-polarity organic chemicals that may be recovered by the present invention are diverse. The types of oils and hydrocarbons include mixtures of oils, hydrocarbons and low-polarity organic chemicals as well as pure substances. The hydrocarbon oils include any and all crude oils of various API gravity, sulfur content and other physical properties; hydrocarbon oils of a paraffinic, isoparaffinic, naphthenic, or aromatic nature as well as polybutenes and other synthetic oligomers and polymers.

Examples of the types of refinery cuts and fuels that may be recovered by the invention include white gas, fully blended gasolines and gasoline blending streams, kerosene, jet fuels, mineral spirits and similar solvents, diesel fuels, home heating oil and other hydrocarbon refinery streams that encompass practically any refinery cut even down to the heavy oil cuts boiling into the 900-1300° F. range and even certain products from the 1300° F.$^{+}$ bottoms. Other oils, hydrocarbons and bitumen suitable for absorption recovery with the invention may be derived from tar sands, shale oil, coal liquifaction products and the like. Additional edible oils suitable for absorption recovery are the waxes, and vegetable, animal, and fish oils, both saturated and unsaturated. It should be understood however, that the above examples do not include a finite list, but are merely examples. Other types of materials, oils, hydrocarbons, and low-polarity organic chemicals will be apparent to one skilled in the art.

Types of low-polarity organic chemicals that may be recovered by the invention are diverse and varied as well. Examples include certain saturated or unsaturated aliphatic, naphthenic, or aromatic substituted: oxygen derivatives of alcohols, phenols, ethers, ether alcohols, epoxides, esters and ester derivatives, aldehydes, acetals, ketones, ketals and nitrogen containing derivatives of amines, nitrites, and sulfur containing derivatives of mercaptans, disulfides, and heterocyclic derivatives thereof and halocarbons and organosilanes or halosilanes, silicones, and other low-polarity organometallic compounds and the like. The types of low-polarity organic chemicals mentioned are not intended to be all encompassing, but simply as functional group examples to demonstrate to one skilled in the art the breadth of utility of the present invention.

Since the preferred product of the invention is most widely available in a granular bulk form, it is often desirable to incorporate the product into a sheathing to create a disposable absorbent sock, boom, or pad containing the product. The objective is to allow the hydrocarbon or non-polar chemical to pass through the sheathing, but not allow the inventive product to pass out of the sheathing before or during use. As it is one objective that the preferred absorbent of the invention lock in the hydrocarbon or non-polar chemical into a stable polymer matrix and not return it to the environment, the sheathing should preferably have a pore size of approximately 200 microns. Such a size will prevent the product from escaping.

One embodiment of the invention utilizes a fabric or textile as the sheathing material. Polyester tricot knit fabrics can be used as suitable sheathing material. A second example of material is a polypropylene extruded net material with a small diamond shaped hole size of 0.015 inch and a thickness of 0.030 inches. Both of these materials exhibit negligible water absorption, thus allowing the sheathing after mixing with the spill to be burned efficiently as an energy source in, for example, a cement kiln. Thus, the resultant sheathing material is rendered into a usable, salable product.

In accordance with another embodiment, the elastomeric block copolymer can be mixed with drilling waste during the drilling process. When drilling for certain substances, such as oil, there is normally byproduct waste created. Some of the waste takes the form of drill cuttings. These drill cuttings are mixed with drilling mud, which is typically used to lubricate and cool the drill during use as well as to flush the cuttings out of the hole created. As drilling cuttings are flushed by the mud to the surface, there tends to be spillage of the mixture onto the surface. When this occurs, the elastomeric block polymer may be added to the spill. The elastomeric block polymer can also be added the waste mixture that did not spill onto the surface if a means is needed for easy removal of the waste mixture. When the elastomeric block polymer is added to this waste mixture, a mat is created. This mat can be used as a fuel source capable of giving off as much as 19,000 BTU's of energy. The fuel source can be utilized as a low ash and high-energy fuel in, for example, cement kilns.

In accordance with another embodiment, the elastomeric block copolymer can be molded into three-dimensional products. When in particulate form, the elastomeric block polymer may be in placed into, for example, a plastic bag. The bag containing the particles may then be vacuum sealed. The container is then heated at a sufficient temperature for a sufficient amount of time to form a molded absorbent article. A suitable temperature is 106° Fahrenheit for a suitable time of approximately 24 hours. The molded absorbent material still retains absorbent properties, however, through the simple process of heating, it can be molded into whatever shape the manufacturer desires. An example would be to mold the particulate product into an aesthetically pleasing floor mat that could be placed in a garage under a motor vehicle or in an industrial setting where machine fluids are known to leak. Examples of aesthetically pleasing designs could be a company or individual name or company logo.

SEPTON 4033 was determined to provide the best performance for elasticity and absorbance among the SEPTON 4000 and SEPTON 8000 series of products. When comparing the performance of triblock copolymers of the invention with triblock copolymers of the prior art, qualitative observations were made using elasticity and absorption characteristics as the criteria. Two rating scales, one for elasticity and one for the absorbency properties of the invention were created for the purpose of making observations in the examples that follow.

Elasticity Rating
10. Strong single dry mat, with excess polymer on the surface
9. Single mat, dry mod strength
8. No mat, but dry crumbs with excellent absorption
7. Single mat, slightly oil wet, small particle, contracted
6. Single mat, tacky, with some strength
5. Single mat, very tacky with low strength
4. Single weak mat, very tacky, breaks easy with light pressure
3. Single weak mat, very tacky, dissolved most of the elastomer
1. No mat, oily looking crumbs
1. No mat, oily looking, very tacky, polymer total dissolved in oil Absorbency Properties
10. Absolutely no oil sheen or film, mat dry and firm to touch with excess polymer on top
9. No oil sheen, mat looks dry, but not to touch with excess polymer on top
8. No obvious oil sheen ~0-15 ppm oil, polymer leaves residue on circumference of vessel
7. Very, Very slight oil sheen, ~15-30 ppm, polymer looks dry but will leave oil to touch
6. Slight oil sheen ~250-500 ppm, polymer looks somewhat dry on surface, but oily touch
5. Significant oil sheen, polymer looks oily 500-1,000 ppm
2. Lots of oil on water, 1-2% and looses oil to absorbent paper towel
3. Only moderate polymer absorbency, looses oil to absorbent paper towel
2. Low polymer absorbency, looses lots of oil to absorbent paper towel
1. No absorbency Initial percent oil bleed was quantitatively measured by weighing a section of absorbent tissue or paper towel and blotting the residual surface oil from the elastomer mat and container and re-weighing the absorbent material, the difference being related to the initial oil or hydrocarbon bleed. As the elastomer/hydrocarbon or low-polarity organic chemical mixture ages, additional bleed is often much lower. The absorbent tissue or paper towel has dimensions of about 10 cm×10 cm folded over 2-3 times to provide a thickness of about 2-3 mm. The bleed was determined by the weight differences.

A further measure of oil bleed was obtained from extracting the oil or hydrocarbon residual on the water's surface with methylene chloride, drying by filtering through anhydrous sodium sulfate, and performing a gas chromatography analysis for Total Petroleum Hydrocarbons (EPA method 8015m).

Example 1

The results of these procedures are summarized in Table 1. Five grams of Bartlesville Sand crude oil (nominally 37-38 API gravity) was placed on the surface of 100 g of tap water in a beaker. With the beaker on the balance, 2.50 g of triblock copolymer was sprinkled evenly on the surface of the water. The beaker was set aside for 60 minutes before further experimentation. In a second series of experiments, 1.00 g of triblock copolymer was used according to the procedure.

As can be seen from the results in Table 1, the preferred object of the invention using SEPTON 4033 had better absorbency than the prior art at the higher concentrations, but extensively outperformed the prior art at the lower useful range of copolymer to crude oil concentrations. The KRATON G-1650 triblock copolymer was the closest of the prior art to SEPTON 4033, but at lower concentrations the KRATON G-1650 mat actually looked more like a "tar-like" substance that rolled up into a ball as a polypropylene fiber would when it absorbs oil. Again suggesting from its molecular structure, that the mid-block segment is more like an amorphous polyolefin with ethyl branching than the SEPTON mid blocks segments that have a very minor degree of unsaturation with only methyl branches and some level of crystallinity in the mid block. Polyolefins adsorb oil more than they absorb oil. KRATON G-1651 and KRATON G-1652 did not perform well at all at the lower concentrations of utility.

TABLE 1

Comparison of SEPTON 4033 with KRATON Elastomers For Absorbing 5 g Crude Oil[1] on Water[2].

| Entry No. | Elastomer | Elasticity Rating | Absorbency Rating | Oil Content on Paper Towel |
|---|---|---|---|---|
| 1 | 2.50 g SEPTON 4033 | 10 | 10 | None |
| 2 | 1.00 g SEPTON 4033 | 7 | 7 | 0.39 g (no polymer) |
| 3 | 2.50 g KRATON G-1650 | 10 | 9 | None |
| 4 | 1.00 g KRATON G-1650 | 2 | 7 | 0.81 g |
| 5 | 2.50 g KRATON G-1651 | 6 | 9 | Slight Show |
| 6 | 1.00 g KRATON G-1651 | 2 | 4 | 1.15 g |
| 7 | 2.50 g KRATON G-1652 | 10 | 8 | None |
| 8 | 1.00 g KRATON G1652 | 2 | 4 | 1.01 g |

[1]Bartlesville Sand Crude Oil
[2]100 g of water

Example 2

A sample such as Entry 2, Table 1, was prepared from the mixture of 5.00 g of crude oil and 1 g of SEPTON 4033 on 100 g of ice in a plastic cup. The ice was allowed to thaw over the period of 1 hour while the invention absorbed the crude oil and formed an elastic mat. After 1 hour, the sample was briefly contacted with a propane torch. The sample flash burned for a second and self extinguished indicating volatile light ends of the crude oil were combusted. The rubber mat was examined and judged to have superior elastic strength compared to a similar mat that had not been contacted with the flame.

Example 3

5.00 g of Bartlesville Sand crude oil was added to a beaker followed by the careful addition of 2.50 g of SEPTON 4033. The elastomer immediately absorbed the oil in the beaker. With a small amount of stirring with a spatula, the oil film on the bottom of the beaker was absorbed to the point the beaker was clean and without an oily film. The SEPTON 4033, which was not oily in appearance, had matted together. A pre-weighed paper towel was used to blot any oil off the polymer and dry clean the beaker by wiping. The additional weight on the towel from this process was 0.0045 g or approximately 0.09% of the original crude oil weight.

5.00 g of Bartlesville Sand crude oil was added to a beaker, followed by 2.50 g of Oil Dri Premium Absorbent Fuller's Earth. At this point it became obvious the amount of Oil Dri was insufficient to absorb the crude oil. Therefore, additional Oil Dri was added in 2.50 g increments up to 15.00 g or six times as much as the SEPTON 4033 elastomer. At this point the crude oil was being absorbed, but the beaker still had an extensive oil film on the bottom surface no matter how much it was stirred. The absorbent also had an oily surface. A pre-weighed paper towel was used to blot any oil from the polymer and dry clean the beaker by wiping. The additional weight on the towel from this process was 0.1956 g or approximately 3.91% of the original crude oil weight at 6 times the weight of clay sorbent. The experiment was repeated with 5.00 g of crude oil and 20.00 g of Oil Dri. The Oil Dri was still oil wet and the amount of Oil Dri was increased to 25.00 g total (5 times the weight of oil and 10 times the weight of SEPTON 4033) at which time the Oil Dri did not have an oil wet surface that left any significant oil spotting on a paper towel. The beaker surface that was contacted by the oil was still not as clean as with the SEPTON 4033 product and it may never become that clean because of surface differences between the absorbents.

Example 4

The following hydrocarbons and low-polarity organic chemicals were tested for elasticity and absorption with SEPTON 4033 using the ratings defined above. In cases where the low-polarity organic chemicals were slightly water soluble or denser than water, the tests were conducted neat. Unless otherwise noted 5.00 g of hydrocarbon or low-polarity organic chemical was placed on 100 g of water and 2.00 g of SEPTON 4033 was added evenly across the surface of the water. The aromatic hydrocarbons tended to dissolve the SEPTON 4033 at low elastomer concentrations, but worked well when the experiment was conducted at higher SEPTON 4033 concentrations. Most of the low-polarity organic chemicals tested received higher ratings at higher concentrations of the preferred invention. For optimization, different preferred invention concentrations are required for different types of substances. It is interesting to note, tetrachloroethylene tended to dissolve the SEPTON 4033 mat into a firm gel, but 1,1,1-trichloroethane matted with out dissolving the SEPTON 4033. Dimethylmethyl phosphonate is often used as a simulant for the chemical warfare agent Sarin, a nerve agent. This suggests utility for agricultural chemical spill clean up or initial protection from chemical warfare agents.

TABLE 2

SEPTON 4033 Performance With Hydrocarbons and Low-Polarity Organic Chemicals.

| Substance | Elasticity Rating | Absorption Rating | Comments |
|---|---|---|---|
| Unleaded Gasoline | 6 | 8 | |
| JP-8 Jet Fuel | 6 | 8 | |
| No. 2 Diesel Fuel | 6 | 7 | |
| Citgo 10W-30 Synthetic Motor Oil | 8 | 10 | |
| Trop Artic 10W-30 Motor Oil | 8 | 7 | |
| Norpar 13 (Paraffinic Hydrocarbon) | 10 | 10 | |
| Exxsol D-110 (Aliphatic Hydrocarbon) | 10 | 10 | |
| Isopar M Fluid (Synthetic Isoparaffin) | 8 | 10 | No Mat |
| Aromatic 100 Fluid | 4 | 8 | Dissolved SEPTON 4033 |
| FCC Slurry Oil Hydrotreater Feed | 6 | 5 | Used 1.1 g SEPTON 4033, Tacky |
| Mineral Spirits | 4 | 7 | Dissolved SEPTON 4033 |
| Mineral Spirits | 9 | 10 | Used 5 g SEPTON 4033 |
| Xylenes, Mixed | 4 | 7 | Dissolved SEPTON 4033 |
| Xylenes, Mixed | 9 | 10 | Used 5 g SEPTON 4033 |
| 1,1,1-Trichloroethane | 8 | 10 | No water, left dry surface |
| Tetrachloroethylene | 6 | 8 | No water, TCE dissolved SEPTON 4033 |
| 56% Malathion | 8 | 7 | No water, left slight film |
| Dimethylmethylphosphonate | 8 | 6 | No water, left slight film |
| Methylethylketone | 8 | 7 | No water, left slight film |

1. 100 g of water

Example 5

Bartlesville Sand crude oil (5.00 g) was added to a beaker with 100 g of water. 1 g of SEPTON 4033 containing 2% sodium stearate was added evenly over the surface. After 60 minutes, a significant reduction in tackiness and oil bleed was observed as demonstrated by Entries 1 and 2 in Table 3. Likewise, blending 15% KRATON D1701 with SEPTON 4033 provided a similar improvement (Entries 1 and 3).

TABLE 3

Improvements to SEPTON 4033 Elastomer Crude Oil[1] Absorption on Water[2].

| Entry No. | Elastomer | Elasticity Rating | Absorption Rating | Comments |
|---|---|---|---|---|
| 1 | 1.00 g SEPTON 4033 | 7 | 7 | Control |
| 2 | 1.00 g SEPTON 4033 w/2% Sodium Stearate | 9 | 9 | Reduced tackiness and oil bleed |
| 3 | 1.00 g SEPTON 4033w/ 15% KRATON D1701 | 9 | 9 | Reduced tackiness and oil bleed |

[1]Bartlesville Sand Crude Oil
[2]100 g of water

Example 6

Bartlesville Sand Crude oil was added to water in a bottle and shaken vigorously. The sample had 1,260 ppm Total Petroleum Hydrocarbons (TPH) as determined by gas chromatography (gc) (EPA Method 8015m). A 20 ml syringe was packed with SEPTON 4033 and the crude oil/water mixture was poured into the syringe. The filtrate was collected and shown by gc analysis to contain 113 ppm crude oil. Half of the filtrate was placed in a second syringe packed with SEPTON 4033 and the filtrate was collected and found to contain 1.52 ppm TPH. This experiment demonstrates the applicability of the invention as a filter for cleaning hydrocarbon contaminated water.

Example 7

Approximately 100 g of SEPTON 4033 crumb was placed in a plastic bag and vacuum sealed. The bag was left for two days at room temperature and re-opened. The SEPTON 4033 crumb had not changed in any way. Another bag was placed in an oven at 106° F. for 24 hours. When the vacuum seal was broken, the particulate was unexpectedly molded into a single mat of SEPTON 4033. The mat had dimensions of 4×2 inches. The tear strength or force required to tear the mat in half was determined to be 10 lbs using a digital scale. The molding procedure at 106° F. was repeated with KRATON G-1650 and an identical size mat was formed. The tear strength or force required to tear the mat in half was determined to be approximately 200 g which is substantially less. Crude oil (5.00 g) was allowed to drip onto a 1.00 g square piece of the SEPTON 4033 mat and it was determined the mat absorbed the same quantity of oil or fuel that it would normally absorb as if it were a crumb. This example demonstrates the superior physical strength properties of the invention over the prior art. This example also teaches this elastomer can be molded into a form for easy recovery of a hydrocarbon contaminant.

Example 8

Leachability of a contaminated substance is determined by analysis of the leachate extraction water from a Toxicity Characteristic Leaching Procedure (TCLP), EPA 1311 for Total Petroleum Hydrocarbons (TPH)(EPA 8015m). Passing EPA TCLP is a requirement of solid characteristic waste that is land filled. A 10.00 g sample of kerosene was placed on 100 g of water in a beaker and 6.20 g of SEPTON 4033 was added evenly to the surface of the kerosene. The sample was allowed to stand for 24 hours. A firm mat formed with gel-like properties and a slight hydrocarbon odor. The mat was cut into cubic chunks of approximately 1 centimeter and extracted according to the EPA TCLP method EPA 1311. GC analysis (EPA 8015m) of the extract indicated TPH of the boiling range for kerosene to be 7.82 ppm. This level of leachate is well with in the regulatory range.

Example 9

COD is an important parameter for determining the amount of organic pollution in water. The term has its widest application in measuring waste loadings of treatment plants and in evaluating the efficiency of treatment processes. Most commercial spill response products of the art do not meet the stringent COD standards for facilities that is set by the EPA for storm water runoff at 120 mg/L of water. COD testing demonstrated the preferred invention, SEPTON 4033, is an environmental attractive material because it is not a COD contributor and any product absorbed by SEPTON 4033 does not extensively contribute to the COD of the system by leaching into water.

COD is determined by measuring the amount of oxidant consumed using titrimetric, photometric or calorimetric methods. The COD test uses a strong chemical oxidant, potassium dichromate in sulfuric acid, heated to 150° C. for two hours to oxidize the organic carbon of the system to carbon dioxide and water. Pre-measured quantities of oxidant may be purchased in capped vials. Two ml of wastewater sample is added to the tube prior to heating. The sample usually requires dilution by some factor to bring the COD into the measuring range of 0-1,500 mg/l. The calorimeter is zeroed using a blank water sample, and then the COD is read from the instrument and multiplied by the dilution factor. For the COD analysis, HACH Reactor Digestion Method 8000 (EPA approved for wastewater analysis from EPA Method 410.4) with 0-1,500 mg/L test vials and a HACH 890 calorimeter was used.

To evaluate the COD contribution of the elastomeric invention, 5.00 g of SEPTON 4033 was added to 1 L of tap water in a clean 2000 ml beaker. A 5 ml water sample was taken from the center of the beaker. A COD vial (3 mg/l limit) was filled with 2 ml of the water sample and the COD contribution of SEPTON 4033 was determined to be 5 mg/l after subtracting out the tap water blank of 4 mg/l. COD measurement is accomplished using the HACH Reactor Digestion Method 8000 (EPA approved for wastewater analysis from EPA Method 410.4) [FR Apr. 21, 1980, 45(78), 26811-26812] with 0-1,500 mg/l test vials and a HACH 890 colorimeter.

In another experiment, 10 g of JP-8 jet fuel was added to 1 L of tap water in a clean 2000 ml beaker. A 5 ml water sample was taken immediately for initial COD analysis. Five grams of the Septon 4033 was sprinkled on the surface of the JP-8. Additional 5 ml samples were taken at 5, 15, 30 and 60 minutes for COD analysis.

The results are shown in Table 4 from the analysis. The 10.00 g of JP-8 covered the surface of the water, so it was not possible to obtain a sample by pipette without disturbing the JP-8 layer and some of the JP-8 registered in the initial test result. Consequently, the COD values for the pollutant only were higher (530 mg/l). Once the SEPTON 4033 was added to the JP-8, the JP-8 layer contracted as it was absorbed into the Aqua N-Cap polymer. Within 5 minutes a gel mat had formed and hardened as the test proceeded to 60 minutes making it easier to grab sample aliquots. The water COD continued to decrease from 68 mg/l at 5 minutes to 37 mg/l at 60 minutes. After the residue was carefully removed, the COD was 21 mg/l. The experiment was repeated using Aircraft Engine Oil 7808. The COD vials used were 20 mg/l limit and the COD of the water was consistently below the limit.

TABLE 4

Static COD Testing (mg/l) of Contaminant With SEPTON 4033 on Water[1].

| Contaminants | Pollutant/ Tap Water | Pollutant + ANC[2] on Tap Water | | | | After Remove Residue |
|---|---|---|---|---|---|---|
| | | 5 Min. | 15 Min. | 30 Min | 60 Min. | |
| JP-8 | 530 | 68 | 41 | 34 | 37 | 21 |
| Engine Oil 7808 | <20 | | <20 | <20 | <20 | <20 |

[1]Average of Triplicate Runs
[2]ANC = Aqua N-Cap polymer

SEPTON 4033 is an exceptional elastomer for recovering hydrocarbons from the surface of water and leaving the water with very low COD after the remediation. The water with JP-8 fuel had an average residual COD level of 21 mg/l. The 7808 motor oil tests consistently averaged at <20 mg/l (limit).

549.45 ml of synthetic seawater) was used. Other test concentrations used were 0.7, 1.3, 2.5, and 5.0 ppm. The SRT control determines sensitivity of test organisms to a known toxicant at 10,000 ppm was used at 2.6, 4.3, 7.2, 12.0, and 20.0 ppm SDS. The 48 hour survival data were used to estimate the 48-hour LC50, a point estimate of the concentration expected to result in 50% mortality to exposed *M. bahia* or *M. beryllina* larvae after 96 hours of exposure. Survival in the concurrent laboratory performance control was 100.0 percent.

At 24-hour intervals during the 96-hour tests, water quality parameters in each treatment were measured. At 0, 24, 48, 72, and 96-hour intervals the number of survivors in each replicate of each treatment were recorded. The results of the aquatic testing are shown in Table 5. As can be seen by the data, SEPTON 4033 of the invention alone has a very low level of toxicity on the water's surface because of its hydrophobic nature. Testing of a SEPTON 4033/No. 2 fuel oil mixture demonstrated SEPTON 4033 does not make the No. 2 fuel oil more toxic than the No. 2 fuel oil alone.

TABLE 5

Aquatic Testing of SEPTON 4033 Polymer on Water.

| Results | *M. bahia* Survival | | *M. beryllina* Survival | |
|---|---|---|---|---|
| | 48-hr LC50 | 95% Confid. Interval | 48-hr LC50 | 95% Confid. Interval |
| Invention[1] | 104,000 ppm | 84,600-126,000 ppm | 482,000 ppm | 403,000-577,000 ppm |
| No. 2 Fuel Oil | 1.45 ppm | 1.20-1.75 ppm | 15.8 ppm | 14.3-17.4 ppm |
| 1:10 Invention/No. 2 Fuel Oil | 2.13 ppm | 1.83-2.49 ppm | 22.5 ppm | 19.1-26.5 ppm |
| Reference Toxicant SDS | 9.55 ppm | 8.56-10.7 ppm | 3.65 ppm | 3.30-4.03 ppm |

[1]Invention = a SEPTON 4033 polymer base

Example 10

Products used for spill recovery should be listed on the National Oil and Hazardous Substances Pollution Contingency Plan Product Schedule List, Subpart J, 40 CFR 300.900 or NCP List for short. When the listing requirements for a product are satisfied, the product is then authorized for use on a particular oil spill on the seas. The preferred triblock polymer of the invention has satisfied the testing requirements and it is not toxic to marine life nor does it contain hazardous constituents.

Four 96-hour static LC50 tests were conducted by Environmental Enterprises USA, Inc. located in Slidell, La. 70461 using the preferred invention, SEPTON 4033, No. 2 Fuel Oil, and a Standard Reference Toxicant (SRT) with Sodium Dodecyl Sulfate. Seven day old *Menidia beryllina* were used when the test was initiated in synthetic seawater and for a separate test, mysids were collected from breeding cultures of *M. bahia* and used. Materials and methods for the work performed are strictly as stated in DR/Vol. 59, No. 178/47461-47464: Revised Standard Dispersant Toxicity Test.

The inventive polymer, SEPTON 4033, was used at the highest test concentration possible, 800,000 ppm, 800 ml of product and 200 ml of dilution water for a total of 1000 ml. Other concentrations were 50,000, 100,000, 200,000, and 400,000. A 1000 ppm solution (0.50 ml No. 2 fuel plus 499.5 ml synthetic seawater) of No. 2 fuel oil was used in the test. Other concentrations were 0.7, 1.3, 2.5, and 5.0 ppm. A 1:10 mixture of the invention to No. 2 Fuel Oil (0.05 ml or 0.01 g of the invention plus 0.50 ml of No. 2 Fuel Oil plus The NCP application has been submitted for listing the invention on the NCP. Table 6 lists the analyses performed in accordance with 40 CFR 136 and amendments. The metals analysis is indicated most of the heavy metals were below detection limits of the analysis except for a low concentration of copper.

TABLE 6

Analyte Testing of SEPTON 4033 Polymer.

| Analyte/Method # | Result[2] | Detection Limit |
|---|---|---|
| pH/9045C | 4.08 | +/−0.01 |
| Specific Gravity/ASTM D1298 | N/A | — |
| Flashpoint/1020B | >110° C. | +/−1° C. |
| Cyanide/335.4 | ND | 0.1 ppm |
| Arsenic/CLP | ND | 1.0 |
| Cadmium/CLP | ND | 0.05 |
| Chromium/CLP | ND | 0.325 |
| Copper/CLP | 17.25 | 0.275 |
| Nickel/CLP | ND | 0.225 |
| Lead/CLP | ND | 0.08 |
| Zinc/CLP | ND | 0.45 |
| Mercury/CLP | 0.02 | 0.02 |

[1]Invention = a SEPTON 4033 polymer base
[2]Data reported in mg/kg unless otherwise noted.

According to the method of forming three-dimensional objects of the present invention, it is found that three dimensional structures can be formed using SEEPS crumb (particulate, or particles) using moderate pressures (10-400 psi) at modest temperatures (80-300° F., hereinafter defined as "low temperatures", and optimally between 90 and 250° F.) which is well below the melting point typical of SEEPS polymers. In the preferred embodiment of this invention, the polymer exhibits a melt index of <0.1 g/10 min. at 200 deg C. per ASTM D-1238. This "cold setting" process can be used to form structures much larger with high tensile strength than those described in the prior art (U.S. Pat. No. 6,344,519 and U.S. Pat. No. 7,048,878) without the need of a binding agent such as EPDM to "bind" the polymer granules together. The unique properties of the low molecular weight SEEPS polymers (in particular the SEPTON 4033) with the soft isoprene/butadiene amorphous chains, provides significant improvement in the low temperature forming characteristics compared to other materials.

This "cold setting" fabrication process does not significantly affect the inherent oil absorbing properties of the polymer, but it provides significant structural memory to allow large three dimensional forms to be created. These forms such as disks, pads, and boom (cylindrical) structures are deployable for the purposes of hydrocarbon and low polarity chemical spill clean-up on hard surfaces and water surfaces with minimal loss of granules from the structure.

Example 11

In one experiment, a prototype compression mold was used to form round disks using low pressures and temperatures. The mold temperature was set at 200° F. during a 15 minute cycle to produce a 1.25 ounce, four inch round disk 0.5 inches thick. Septon 4033 was the block copolymer of choice. The pressure is bumped to 400 psi to set the crumb and subsequently lowered into the 25 to 200 psi range through out the molding cycles.

A pad of the invention was set on top of Number 2 diesel in a container. The disk appeared to become saturated with diesel fuel in 15 seconds. The diesel flowed through the disk nicely with only one small area on the top surface that did not appear to wick the diesel fuel. The disk set on the diesel for a total time of 15 minutes before being removed. Very little diesel dripped from the disk as it was removed. The swollen disk had some tackiness, but it could be handled easily. The 1.25 ounce disk contained 2.9 ounces of diesel fuel or 2.4 times its weight in fuel.

The elastomeric block copolymer can be formed into various shapes to enable recovery of oils, hydrocarbons, and low-polarity organic chemicals without a binder. These shapes can include fundamental articles such as disks, pads, and booms of various design that aid in inhibiting "gel blocking". "Gel blocking" is a state in which the first quantity of absorbed oil combines with an outer layer of particulate in a design to form a barrier, preventing unabsorbed oil from continuing into the part to reach inner layers of particulate and be absorbed thereby. Low temperature and pressure compression molding of elastomeric block copolymers of the invention without the use of a binder into shapes is novel and unique.

The preferred shapes of the invention include but are not limited to:

A circular, flat disk, 4 to 12" in diameter and approximately ½" to ¾" thick. The disk incorporates features to enhance and optimize bulk density and maximize exposed surface area such as dimple or waffle patterns. Variations may include "flower petal or star-shape" type designs and include perforations to allow for additional surface contact with formed granules.

A rectangular pad, 12 inches wide by 24 inches long and approximately ½ to ¾ inch thick of optimum bulk density. The pad can incorporate features to enhance and maximize exposed surface area such as dimple or waffle patterns. Variations may include features for interlocking multiple pads together include perforations to allow for additional surface contact with formed granules.

Small formed round balls, ½" to 1" in diameter.

Cylindrical objects from 1" to 3" in diameter and 12" to 36" in length. Variations may include a polypropylene rope molded through the axial centerline of the object to improve strength and enhance the ability of the object to be secured to other objects such as boats, docks, or other structures. The cylindrical object can incorporate features to enhance and maximize exposed surface area such as radial fins, dimples, or waffle patterns.

The three dimensional object ranges in size from less than an inch in thickness to several inches or feet in each dimension of length, width, thickness, height, or diameter.

It should also be understood that the three dimensional object may be attached to other three dimensional objects. This attachment could be by a rope, interlocking pieces from the geometric shape, or any other method of attachment.

It is contemplated that the three dimensional object can used for absorbing hydrocarbons and non-polar organic chemicals from surfaces. These surfaces could be hard surfaces, including soil and the surface of water.

The three dimensional object that has absorbed hydrocarbon or non-polar organic chemicals may be recovered and used for energy such as by burning. The three dimensional object that has absorbed hydrocarbon or non-polar organic chemicals may be also be used as an accelerant for starting slash fires to reduce the probability of a forest fire.

As will be apparent to those skilled in the art, a number of modifications could be made to the preferred embodiments which would not depart from the spirit or the scope of the present invention. While the presently preferred embodiments have been described for purposes of this disclosure, numerous changes and modifications will be apparent to those skilled in the art. Such changes and modifications are encompassed within the spirit of this invention.

What is claimed is:

1. A method of forming a three-dimensional object from a hydrocarbon or low-polarity organic chemical absorbing substance, the method comprising:

applying pressure to particles of a polymeric material comprising a styrene-ethylene/ethylene/propylene triblock copolymer containing from approximately 20 to 40 percent styrene, and heating said particles for a period of time sufficient to form the three-dimensional object.

2. The method of claim 1 wherein said particles are heated at a low temperature.

3. The method of claim 2 wherein said particles are heated at a temperature between approximately 100° F. and 250° F.

4. The method of claim 3 wherein said period of time sufficient to form the three-dimensional object is between approximately 5 and 30 minutes.

5. The method of claim 2 further including subjecting the particles to compression molding over a time period of between approximately 5 minutes and 30 minutes; cooling the particles; releasing the pressure and removing the article from the mold.

6. The method of claim 2 further including vacuum molding the three-dimensional object over a time period of 30 minutes to 24 hours; cooling the object in the mold; releasing the vacuum and removing the object from the mold.

7. A method of claim 1 wherein the pressure ranges between about 20 and 500 psi.

8. The method of claim 7 wherein the pressure ranges between about 40 and 400 psi.

9. The method of claim 8 wherein the pressure is initially high to set the particles and then reduced to a lower level for the remainder of the time.

10. The method of claim 1 wherein the particles are placed in a mold having a predetermined geometric shape.

11. The method of claim 10 wherein said mold design of a three-dimensional article selected from a group consisting of disks, pads, and booms.

12. The method of claim 11 wherein said mold includes design features to enhance and maximize exposed surface area and to aid in inhibiting gel blocking.

13. The method of claim 1 wherein the three dimensional object ranges in size from less than an inch in thickness to several inches or feet in each dimension of length, width, thickness, height, or diameter.

14. The method of claim 1 wherein the three dimensional object is attached to other three dimensional objects.

15. The method of claim 1 wherein said hydrocarbon or low-polarity organic chemical
   comprises at least one of a group consisting of oils, waxes, pure hydrocarbons, fuels, crude oils, bitumen, edible oils, edible waxes, saturated and unsaturated aliphatic, naphthenic, aromatic substituted oxygen derivatives of alcohols, phenols, ethers, ether alcohols, epoxides, esters, aldehydes, acetals, ketones, ketals, nitrogen containing derivatives of amines, nitrites, sulfur containing derivatives of mercaptans, disulfides, heterocyclic derivatives of disulfides, halocarbons, organosilanes, halosilanes, silicones, or chemicals derived from petroleum.

16. The method of claim 1 wherein the three dimensional object is applied to absorb hydrocarbons and non-polar organic chemicals.

17. The method of claim 16 wherein the three dimensional object is applied to soil.

18. The method of claim 16 wherein the three dimensional object is applied to water.

19. The method of claim 16 further including recovering and converting to energy the three dimensional object that has absorbed hydrocarbon or non-polar organic chemicals.

20. The method of claim 16 wherein the three dimensional object that has absorbed hydrocarbon or non-polar organic chemicals may be used as an accelerant for starting slash fires to reduce the probability of a forest fire.

21. A method of forming a solid three dimensional object of a geometry for absorbing hydrocarbons or non-polar organic chemicals comprising:
   a. Heating the mixture to a temperature below the melting point of the styrene-ethylene/ethylene/propylene tri-block copolymer containing from 20 to about 40 percent styrene;
   b. Extruding the thermoplastic elastomer through a geometric die; and
   c. Allowing the extruded mixture to cool.

22. The method of claim 21 further comprising:
   placing said geometrically extruded mixture in a sock, boom, or pad containing said thermoplastic elastomer triblock copolymer in contact with a hydrocarbon or low polarity organic chemical, wherein said sock, boom, or pad comprises a fabric or textile sheathing having pore size of approximately 200 microns;
   permitting said hydrocarbon or low-polarity organic chemical to penetrate said sheathing to mix with said thermoplastic elastomer triblock copolymer geometric pellets; and
   recovering said sock, boom, or pad.

\* \* \* \* \*